United States Patent
Lee et al.

(10) Patent No.: US 9,996,893 B2
(45) Date of Patent: Jun. 12, 2018

(54) DISPLAY APPARATUS CONSTITUTING MULTI DISPLAY SYSTEM AND CONTROL METHOD THEREOF

(71) Applicant: SAMSUNG ELECTRONICS CO., LTD., Suwon-si (KR)

(72) Inventors: Chang-won Lee, Incheon (KR); Jung-keun Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 15/148,664

(22) Filed: May 6, 2016

(65) Prior Publication Data
US 2016/0329030 A1    Nov. 10, 2016

(30) Foreign Application Priority Data

May 8, 2015    (KR) .................. 10-2015-0064582

(51) Int. Cl.
*G09G 5/00*    (2006.01)
*G09G 5/12*    (2006.01)
*G06T 1/20*    (2006.01)
*G06F 3/14*    (2006.01)

(52) U.S. Cl.
CPC .............. *G06T 1/20* (2013.01); *G06F 3/1446* (2013.01); *G09G 5/12* (2013.01); *G09G 5/005* (2013.01); *G09G 2320/103* (2013.01); *G09G 2340/045* (2013.01); *G09G 2340/0407* (2013.01); *G09G 2370/10* (2013.01)

(58) Field of Classification Search
CPC combination set(s) only.
See application file for complete search history.

(56) References Cited

U.S. PATENT DOCUMENTS

| | | | |
|---|---|---|---|
| 6,316,974 B1* | 11/2001 | Taraci | G09G 5/006 327/147 |
| 2002/0175924 A1* | 11/2002 | Yui | G06T 15/40 345/629 |
| 2002/0186212 A1* | 12/2002 | Matsumoto | G09G 3/3659 345/204 |
| 2009/0033289 A1* | 2/2009 | Xing | H02J 7/0065 320/140 |
| 2014/0028923 A1* | 1/2014 | Griffin | G06F 1/1601 348/839 |
| 2016/0357493 A1* | 12/2016 | Zerwas | G06F 3/1438 |

* cited by examiner

Primary Examiner — Wesner Sajous
(74) Attorney, Agent, or Firm — Sughrue Mion, PLLC

(57) ABSTRACT

A display apparatus constituting a multi display system is provided. The display apparatus includes an input connector to receive input of an image, a processor to process an image corresponding to the display apparatus from the input image, a display to display the processed image, and an output connector to transmit the input image to an adjacent display apparatus connected to the display apparatus, and the processor, in response to an image input through the input connector being changed to a second connector from a first image, processes an image corresponding to the display apparatus from the second image, and controls the display to display the processed second image based on a synchronization signal of the first image.

20 Claims, 11 Drawing Sheets

DISPLAY APPARATUS CONSTITUTING MULTI DISPLAY SYSTEM AND CONTROL METHOD THEREOF

CROSS-REFERENCE TO RELATED APPLICATIONS

This application claims priority from Korean Patent Application No. 10-2015-0064582, filed in the Korean Intellectual Property Office on May 8, 2015, the disclosure of which is incorporated herein by reference in its entirety.

BACKGROUND

1. Field

Apparatuses and methods consistent with aspects of one or more exemplary embodiments relate to a display apparatus and a method for controlling the same and, more particularly, to a plurality of display apparatuses constituting a multi display system and a method for controlling the same.

2. Description of the Related Art

In general, a display apparatus is an apparatus which displays at least one image on a single screen. However, a plurality of display apparatuses may be used to display one image, and in this case, each of the plurality of display apparatuses displays part of an image frame. A system where such function is embodied is called a multi display system.

A plurality of display apparatuses constituting a multi display system are connected in series, and may be connected to a source device and provided with an image to be output to the plurality of display apparatuses. In other words, the image is transmitted, sequentially, to a last display apparatus from a source device through each of the display apparatuses. It has a drawback that a single frame is not displayed at the same time according to a time it takes to transmit an image between adjacent display apparatuses, an internal image processing time, and the like. The more the display apparatus constituting a multi display system, the more cumulated an offset time, thereby interrupting a user's watching.

A plurality of display apparatuses have to display a divided image corresponding to each of the display apparatuses almost at the same time using a frame lock functionality. The frame lock functionality indicates that a time point of when an image is output is determined based on a time point of when the image is input.

Such frame lock functionality is executed through link training. The link training refers to constituting a main link by transmitting a training pattern through a physical layer of the main link.

When an input image is changed, the link training is performed again, which generates as much delay time and interrupts a user's watching. In order to minimize time delay, if a link training that only updates some information is performed, instead of a link training that updates all information, a frame lock is not maintained and thus, one frame is not displayed at the same time.

SUMMARY

An aspect of exemplary embodiments is to resolve the aforementioned problems, that is, to provide a display apparatus which, even when an input image is changed, provides a seamless image to a user by displaying the changed image based on a synchronization signal before the image is changed, and a method for controlling the same.

According to an aspect of one or more exemplary embodiments, a display apparatus including a multi display system may include an input connector which receives an image, a processor which processes an image corresponding to the received image, a display which displays the processed image, and an output connector which transmits the received image to an adjacent display apparatus connected to the display apparatus, wherein the processor may, in response to an image input through the input connector being changed to a second image from a first image, process an image corresponding to the display apparatus from the second image, and control the display to display the processed second image based on a synchronization signal of the first image.

The processor may, in response to at least one of resolution and frame rate of an image received through the input connector being changed, determine that the received image is changed to the second image from the first image.

The processor may, in response to a phase difference between a synchronization signal of the first image and a synchronization signal of the second image being greater than or equal to a predetermined value, display the processed second image based on the synchronization signal of the first image.

The processor may continuously display a last image of the first image until the second image is processed and displayed.

The processor may extract information required for the image processing by de-packaging and parsing the received image, and process the image corresponding to the display apparatus from the parsed image.

The processor may include a main processor and a sub-processor which extracts information required for the image processing by de-packaging and parsing the received image, and when the parsing is complete, transmits the parsed image to the main processor, and the main processor may process the image corresponding to the display apparatus from the parsed image, wherein the sub-processor may re-package the parsed image and transmit the re-packaged image to the adjacent display apparatus.

The processor may include a main processor and a sub-processor where the main processor extracts information required for the image processing by de-packaging and parsing the received image, processes the image corresponding to the display apparatus from the parsed image, and transmits the received image to the sub-processor, and the sub-processor transmits the received image to the adjacent display apparatus.

The processor may generate the corresponding image by cropping the received image into a plurality of images according to the number of display apparatuses constituting the multi display system, and scaling the images to correspond to resolution of the display apparatus.

The processor may convert the received image into a display port format and transmit the converted image to the adjacent display apparatus.

The input connector may include an input connector of at least one of display port (DP), digital visual interface (DVI) and high definition multimedia interface (HDMI) formats.

According to an exemplary embodiment, a method of controlling a display apparatus constituting a multi display system may include receiving an image, processing an image corresponding to the display apparatus from the received image, displaying the processed image, and transmits the received image to an adjacent display apparatus connected with the display apparatus, wherein the processing includes, in response to the received image being changed to a second image from a first image, processing an image corresponding to the display apparatus from the second image, and the displaying may include displaying the processed second image based on a synchronization signal of the first image.

The processing may include, in response to at least one of resolution and frame rate of the received image being changed, determining that the received image is changed to the second image from the first image.

The processing may include, in response to a phase difference between a synchronization signal of the first image and a synchronization signal of the second image being greater than or equal to a predetermined value, displaying the processed second image based on the synchronization signal of the first image.

The displaying may include continuously displaying a last image of the first image until the second image is processed and displayed.

The processing may include extracting information required for the image processing by de-packaging and parsing the received image, and processing the image corresponding to the display apparatus from the parsed image.

The processing may include extracting, by a sub-processor, information required for the image processing by de-packaging and parsing the received image, and extracting, by the sub-processor, information required for the image processing, and processing, by the main processor, the image corresponding to the display apparatus from the parsed image, wherein the transmitting may include re-packaging, by the sub-processor, the parsed image and transmitting, by the sub-processor, the re-packaged image to the adjacent display apparatus.

The processing may include extracting, by a main processor, information required for the image processing by de-packaging and parsing the received image, processing the image corresponding to the display apparatus from the parsed image, and transmitting, by the main processor, the received image to a sub-processor, wherein the transmitting may include transmitting, by the sub-processor, the received image to the adjacent display apparatus.

The processing may include generating the corresponding image by cropping the received image into a plurality of images according to the number of display apparatuses constituting the multi display system and scaling the images to correspond to resolution of the display apparatus.

The transmitting may include converting the received image into a display port format and transmitting the converted image to the adjacent display apparatus.

The image may be input through an input connector of at least one of formats of display port (DP), digital visual interface (DVI), and high definition multimedia interface (HDMI).

According to various exemplary embodiments as above, the display apparatus may, even if an image to be input is changed, display the changed image based on a synchronization signal of before the image is changed, and maintain frame lock, thereby providing a seamless image to a user.

BRIEF DESCRIPTION OF THE DRAWINGS

The above and/or other aspects of one or more exemplary embodiments will be more apparent by describing certain exemplary embodiments with reference to the accompanying drawings, in which.

DETAILED DESCRIPTION

Figure 1:
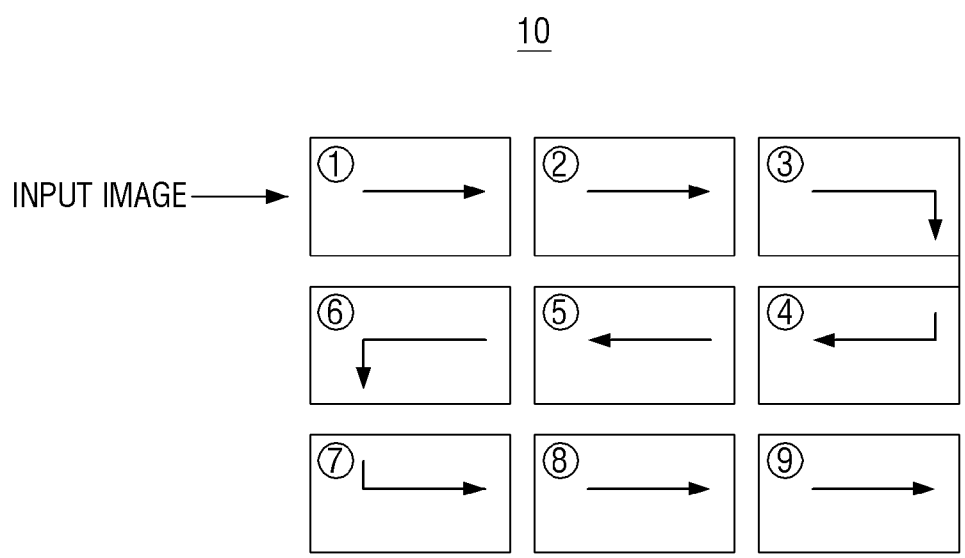
FIG. 1 is a block diagram illustrating a multi display system according to an exemplary embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the present disclosure will be described in detail with reference to the accompanying drawings.

FIG. 1 is a view illustrating a multi display system 10 according to an exemplary embodiment. As illustrated in FIG. 1, the multi display system 10 includes a plurality of display apparatuses.

A display apparatus no. 1 may receive input of an image from a source device. The display apparatus no. 1 may transmit an image to a display apparatus no. 2 adjacent to the display apparatus no. 1.

Display apparatuses other than the display apparatus no. 1 may receive input of an image from a previous adjacent display apparatus, and transmit an image to a next adjacent display apparatus. In other words, an image is not input to a plurality of display apparatus at the same time, but is input sequentially according to a sequence of arrangement of the plurality of display apparatuses. Such multi display system 10 is called the loop out method.

A plurality of display apparatuses may display, by cropping an input image into a plurality of images according to the number of display apparatuses and scaling the images to correspond to resolution of a display apparatus, an image corresponding to the respective display apparatus. For example, in the case of a 3×3 multi display system 10 as illustrated in FIG. 1, the display apparatus no. 1 may only display a divided image corresponding to an upper left corner from among nine divided images where frames of the respective images are divided into 3×3.

A plurality of display apparatuses may display a divided image corresponding to each of the display apparatuses almost at the same time using a frame lock function and display a single frame.

The frame lock function refers to determining an output time point of an image based on an input time point of the image. For example, the display apparatus no. 1 may output an image after a predetermined time elapses from receiving input of an image from a source device. Then, a display apparatus 2 may receive input of the image from the display apparatus no. 1 and then, output the image after a predetermined time, and in this case, the predetermined time may be the same as in the case of display apparatus no. 1.

The predetermined time may be set to be greater than a time it takes for a display apparatus to process an image. Thus, a plurality of display apparatuses may output an image after the same predetermined time upon receiving input of an image in the respective display apparatus.

The plurality of display apparatuses are configured to, when an image is input, transmit the input image to an adjacent display apparatus. Therefore, there may be a difference in displaying time of an image as much as a time it takes to transmit the image between adjacent display apparatuses. In a multi display system 10 using the loop out method, an initial display apparatus and a final display apparatus may differ in image output time as indicated in Equation 1.

$$(n-1) \times t \quad \text{[Equation 1]}$$

Here, n is the number of the entire display apparatuses, and t is a time it takes to transmit an image between adjacent display apparatuses.

For example, according to FIG. 1, since there are a total of nine display apparatuses, there may be a difference of image output time of 8t between the display apparatus no. 1 and a display apparatus no. 9. However, such time difference corresponds to a short time not recognizable by a person, which would not interrupt a user's watching.

Meanwhile, controlling the two predetermined times to be the same is only an example. For example, it is also possible to configure such that a predetermined time gets shorter as it gets closer to the display apparatus no. 9 from the display apparatus no. 1. When a predetermined time is set to be as short as the time it takes to transmit an image between adjacent display apparatuses, an image output time may be same for all the display apparatuses.

In order to maintain frame lock even when an input image is changed to a second image from a first image, a display apparatus may process an image corresponding to the display apparatus from an input second image, and display the processed second image based on a synchronization signal of the first image. For example, when a synchronization signal of the first image and a synchronization signal of the second image differ from each other, a display apparatus may display the second image according to the synchronization signal of the first image, and provide a seamless image to a user by minimizing mute.

As described above, a plurality of display apparatuses maintain a synchronization signal even when a frame lock function and image are changed, thereby providing a seamless image to a user.

Figure 2A:
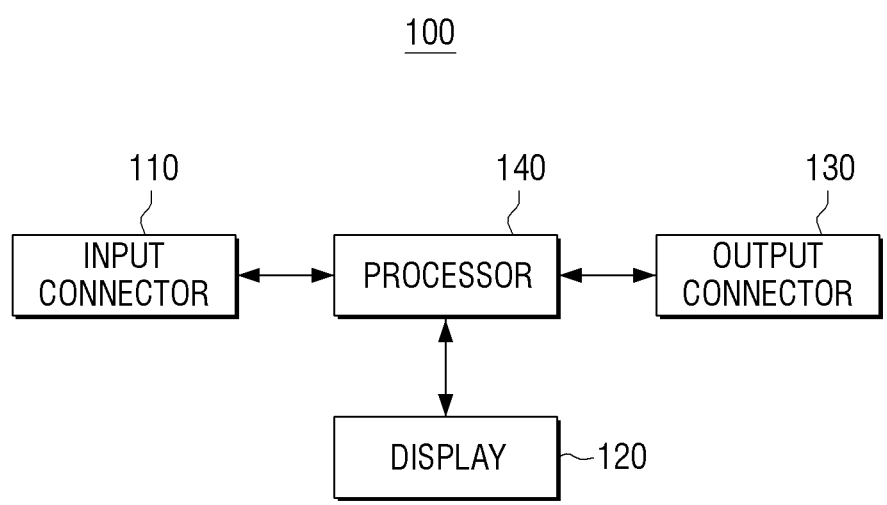
FIG. 2A is a block diagram illustrating a configuration of a display apparatus according to an exemplary embodiment.

FIG. 2A is a block diagram illustrating a configuration of a display apparatus 100 according to an exemplary embodiment.

According to FIG. 2A, the display apparatus 100 includes an input connector 110, a display 120, an output connector 130, and a processor 140.

FIG. 2A illustrates various elements in a comprehensive manner, taking examples where the display apparatus 100 includes various functions such as a display function, a communication function, and the like. According to an exemplary embodiment, some of the elements illustrated in FIG. 2A may be omitted or changed, or another element may be added.

The input connector 110 is configured to receive input of an image from an adjacent display apparatus or a source device. In this case, the input connector 110 may include a plurality of ports to receive input of an image, such as a Digital Visual Interface (DVI), a Display Port (DP), a High Definition Multimedia Interface (HDMI), a component, an RS232C communication, a broadcast signal receiver, and the like. The source device is capable of transmitting an image to each of the display apparatuses, which may include a Personal Computer (PC), a DVD player, a BD player, a PVR, an external server, a web server, and the like.

The input connector 110 may additionally include an input connector for controlling a display apparatus other than the aforementioned input connector for images. Also, the input connector 110 may include a detection connector to identify connection with a peripheral display apparatus, and may additionally include various input connectors as necessary.

The display 120 is a configuration that displays an image processed by the processor 140. The display 120 may be embodied as a Cathode Ray Tube (CRT), a Liquid Crystal Display (LCD), a Light Emitting Diode (LCD), and a Plasma Display Panel (PDP), and the like, but it is not limited thereto. The display 120 may be embodied as a flexible display, a transparent display, and the like, depending on the situation.

The output connector 130 is a configuration that transmits an image to an adjacent display apparatus. In this case, the output connector 130 may be embodied as a connector of Display Port (hereinafter, "DP") format having an auxiliary channel. However, it is not limited thereto, and it may be embodied as a connector of various formats including an auxiliary channel. A DP format will be described later.

The processor 140 is a configuration that controls an overall operation of the display apparatus 100. In particular, the processor 140 may process an image corresponding to the display apparatus 100 from an input image. The processor 140 may generate an image corresponding to the display apparatus 100 by cropping an input image into a plurality of images according to the number of display apparatuses 100 constituting the multi display system 10, and scaling the images to correspond to resolution of the display apparatus 100. An image other than a part of image to be output from the corresponding display apparatus 100 are eliminated by cropping. The processor 140 scales the cropped image to a size of original resolution of the display 120.

The processor 140 may, in response to an image input via the input connector 110 being changed to a second image from a first image, process an image corresponding to the display 120 from the input second image, and display the processed second image based on a synchronization signal of the first image.

The processor 140 may, in response to at least one of resolution and frame rate of an image input via the connector 110 being changed, determine that the input image is changed to the second image from the first image.

The processor 140 may, in response to a phase difference between a synchronization signal of the first image and a synchronization signal of the second image being greater than or equal to a predetermined value, display the processed second image based on the synchronization signal of the first image.

The processor 140 may continuously display a last image of the first image until the second image is processed and displayed.

The processor 140 may extract information required for image processing by de-packaging and parsing an input image, and process an image corresponding to the display apparatus 100 from the parsed image.

The processor 140 may include a main processor and a sub-processor which extracts information required for image processing by de-packaging and parsing an input image, and in response to the image being parsed, transmits the parsed image to the main processor, and the main processor processes an image corresponding to the display apparatus 100 from the parsed image, wherein the sub-processor may re-package the parsed image and transmit the re-packaged image to an adjacent display apparatus.

The processor 140 may include a main processor and a sub-processor where the main processor extracts information required for image processing by de-packaging and parsing an input image, processes an image corresponding to the display apparatus 100 from the parsed image, and transmits the input image to the sub-processor, and the sub-processor transmits the input image to an adjacent display apparatus.

The processor 140 may convert the input image into the DP format and transmit the converted image to an adjacent display apparatus.

The input connector may include an input connector of at least one format of DP, DVI, and HDMI formats.

Figure 2B:
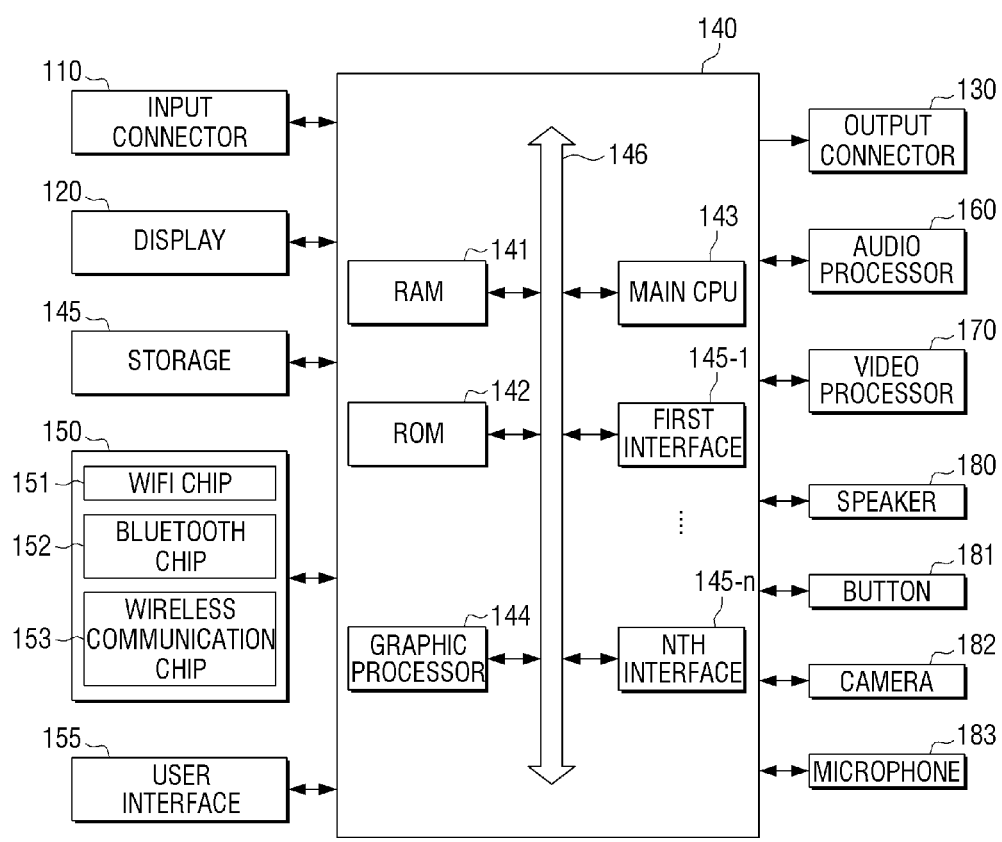
FIG. 2B is a block diagram illustrating a configuration of a display apparatus according to another exemplary embodiment.

FIG. 2B is a block diagram illustrating a detailed configuration of a display apparatus 100' according to another exemplary embodiment. According to FIG. 2B, the display apparatus 100' includes the input connector 110, the display 120, the output connector 130, the processor 140, a storage 145, a communicator 150, a user interface 155, an audio processor 160, a video processor 170, a speaker 180, a button 181, a camera 182, and a microphone 183. A detailed description of elements illustrated in FIG. 2A that overlap with the elements illustrated in FIG. 2B will be omitted.

The processor 140 controls operations of the display apparatus in a comprehensive manner using various programs stored in the storage 145.

Specifically, the processor 140 includes a RAM 141, a ROM, 142, a main CPU 143, a graphic processor 144, first to nth interfaces 145-1 to 145-n, and a bus 146.

The first to nth interfaces 145-1 to 145-n are connected to the aforementioned various elements. One of the interfaces may be a network interface connected to an external apparatus via a network.

The main CPU 143 accesses the storage 145 and performs booting using an operating system (O/S) stored in the storage 145. Then, the main CPU performs various operations using various programs stored in the storage 145, and the like.

The ROM 142 stores a command set for system booting, and the like. When a turn-on command is input and power is supplied, the main CPU 143 copies the O/S stored in the storage 145 onto the RAM 141 according to a command stored in the storage 145, and boots a system by executing the O/S. Once the booting is complete, the main CPU 143 copies various application programs stored in the storage 145 onto the RAM 141, and performs various operations by executing the application programs copied onto the RAM 141.

The graphic processor 144 generates a screen including various objects, such as an icon, an image, a text, and the like, using a computation unit (not illustrated) and a rendering unit (not illustrated). The computation unit (not illustrated) computes an attribute value, such as a coordinate at which each of objects is to be displayed, a form, a size, a color, and the like, according to a layout of screen based on a received control command. The rendering unit (not illustrated) generates a screen of various layouts including an object based on the attribute value computed in the computation unit (not illustrated). The screen generated in the rendering unit (not illustrated) is displayed within a display area of the display 120.

The aforementioned operation of the processor 140 may be performed by a program stored in the storage 145.

The storage 145 is configured to store various data such as an O/S software module to drive the display apparatus 100', an image processing module, and the like.

In this case, the processor 140 may process an input image based on information stored in the storage 145, and display the processed image.

The user interface 155 is configured to receive various user interactions. In this case, the user interface 155 may be embodied in various forms according to an embodiment of the display apparatus 100'. When the display apparatus 100' is embodied as a general digital TV, the user interface 155 may be embodied as a remote control receiver which receives a remote control signal from a remote control apparatus, a camera which detects a user motion, a microphone which receives a user voice, and the like. When the display apparatus 100' is embodied as a digital TV which provides a touch function, the user interface 155 may be embodied as a touch screen constituting an interlayer structure with a touchpad. In this case, the user interface 155 may be used as the aforementioned display 120.

The audio processor 160 is an element that performs processing with respect to audio data. The audio processor 160 may perform various processing, such as decoding, amplification and noise filtering with respect to audio data.

The video processor 170 is an element that performs processing with respect to video data. The video processor 170 may perform various processing, such as decoding, scaling, noise filtering, frame rate conversion, and the like, with respect to video data.

The speaker 180 is an element that outputs various alert sounds or voice messages as well as various audio data processed in the audio processor 160.

The button 181 may be a button of various types, such as a mechanical button, a touch pad, a wheel, and the like, formed in an arbitrary area, such as a front surface part, a lateral surface part, a rear surface part, and the like, of the exterior of a main body of the display apparatus 100'.

The camera 182 is a configuration to photograph a stopped image or video according to a user control. The camera 182 may be embodied as a plurality of cameras, such as a front surface camera and a rear surface camera. The microphone 183 is a configuration to receive input of a user voice or a guitar sound and convert the same to audio data.

Hereinafter, a basic configuration and various exemplary embodiments will be described to help understanding of the present disclosure.

Figure 3:
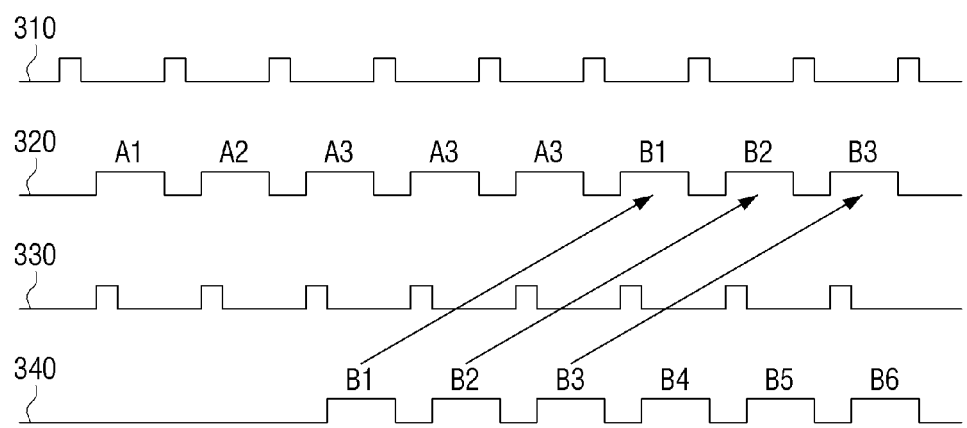
FIG. 3 is a view provided to explain displaying of an image B based on a synchronization signal of an image A according to another exemplary embodiment.

FIG. 3 is a view provided to explain displaying an image B based on a synchronization signal of an image A according to an exemplary embodiment.

According to FIG. 3, an image that is input using the input connector 110 may be changed to an image B from an image A. The change of input image uses the same input connector 110, but it may be the case where a user changes an input image. For example, in the case of a display apparatus 100 connected to a notebook PC via a HDMI, a user may change an input image by executing another image stored in the notebook PC. Alternatively, it may be the case where a user wants to receive an image using an input connector 110 of different specification. For example, the user may control an image to be input from a smartphone using a DVI, and then control the image to be input from a game console via a HDMI.

The processor 140 may display an image A based on a synchronization signal 310 of the image A. In the case where an image is transmitted, a synchronization signal refers to a signal to which a pulse in a horizontal direction and a pulse in a vertical direction are added to synchronize a transmitting end and a receiving end. A synchronization signal indicating the vertical direction is called a vertical synchronization signal, and a synchronization signal indicating the horizontal direction is called a horizontal direction. In general, a period of the vertical synchronization signal is greater than a period of the horizontal synchronization signal.

A synchronization signal consists of a vertical synchronization signal and a horizontal synchronization signal, which may be in a more complicated form than the synchronization signal 310 of the image A illustrated in FIG. 3, but it is illustrated briefly for the convenience of explanation. Hereinafter, with respect to the synchronization signal 310 of the image A, it will be described as to how frames A1 to A3 of the image A, not pixels of the image A, are displayed.

The frames A1 to A3 of the image A may be displayed sequentially based on a synchronization signal. After a third frame A3 of the image A is displayed, the processor 140 may detect that a new image B is being input. A synchronization signal 330 of an image B differs in phase from the synchronization signal 310 of the image A, and the processor 140 may display the image B based on the synchronization signal 310 of the image A.

The processor 140 may process an image corresponding to the display apparatus 100 from the input image B. Accordingly, the processor 140 may display the image B after an image processing time has elapsed after the image B is input, and an order that the images A and B are displayed is disclosed in the frame 320 displayed in the display apparatus 100. The processor 140 may display the image B based on the synchronization signal 310 of the image A to maintain a frame lock and minimize mute.

The processor 140 may display the image B processed based on the synchronization signal 310 of the image A when a phase difference between the synchronization signal 310 of the image A and the synchronization signal 330 of the image B is greater than or equal to a predetermined value. For example, the processor 140 may display the image B processed based on the synchronization signal 310 of the image A when a phase difference between the synchronization signal 310 of the image A and the synchronization signal 330 of the image B is greater or equal to 10% of a period or 1.7 ms. However, this is only an example, and it may as well be set as a different value.

The processor 140 may continuously display a last image of the image A until the image B is processed and displayed.

According to FIG. 3, the image B is input after the image A is input up to A1, A2, and A3 frames, and the processor 140 may continuously display the A3 frame, which is the last displayed frame, until an image processing of the image B is complete, However, this is only an example, and it may as well be possible that the image is mute processed.

Figure 4A:
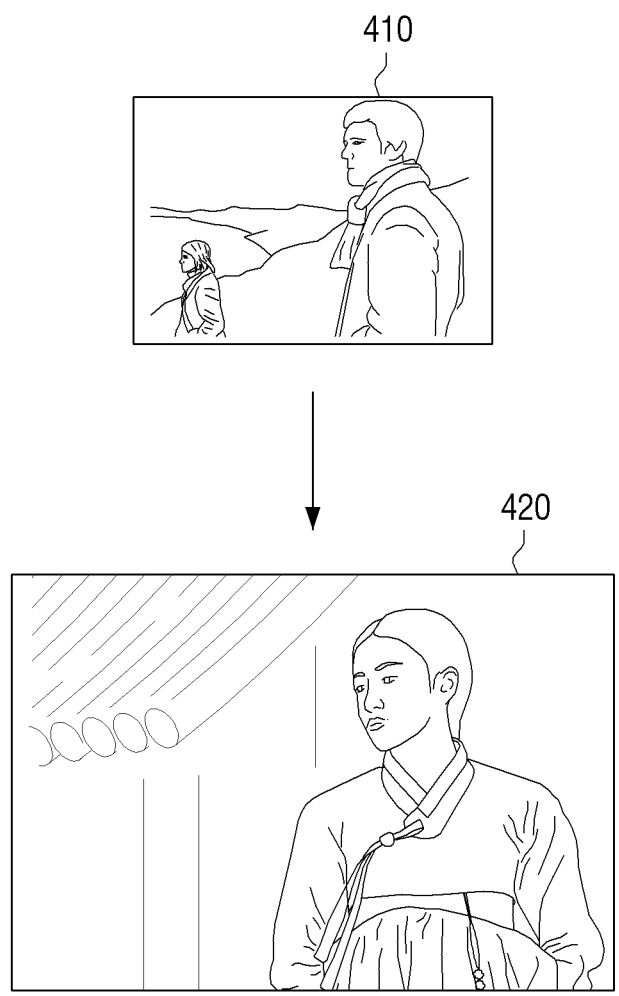
FIG. 4A is a view provided to explain a method for determining a change of image according to an exemplary embodiment.

FIG. 4A is a view provided to explain a method of determining a change of image according to an exemplary embodiment.

According to FIG. 4A, when resolution of an image that is input through the input connector 110 is changed, the processor 140 may determine that the input image is changed. For example, while a resolution of a first image 410 is 800×480, a resolution of a second image may be 1280×720.

Figure 4B:
FIG. 4B is a view provided to explain a method of determining a change of image according to another exemplary embodiment.
Figure 4B:

According to FIG. 4B, when a frame rate of an image input through the input connector 110 is changed, the processor 140 determine that the input image is changed. For example, while a third image 430 has a frame rate of 30 Hz, a fourth image 440 has a frame rate of 20 Hz. Accordingly, while the third image 430 provides three pieces of frames for 0.1 s, the fourth image 440 may provide two pieces of frames.

It was described in FIGS. 4A and 4B that the processor 140 determines that an input image is changed, according to a resolution or frame rate of the image, but it is not limited thereto. For example, the processor 140 may also determine that an input image is changed according to a change of video codec and a change of audio frequency. In addition, the processor 140 may determine that an input image is changed by detecting the aforementioned elements in combination.

Figure 5:
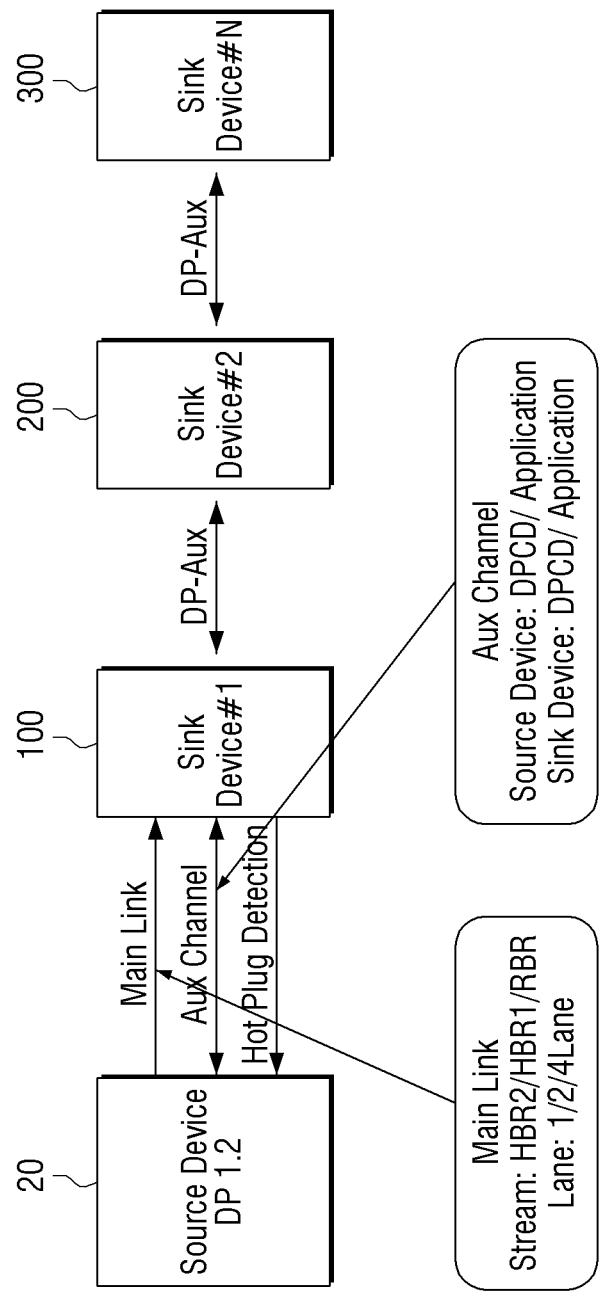
FIG. 5 is a view provided to explain a method for transmitting, by a multi display system, an image through an input connector and output connector of display port format according to an exemplary embodiment.

FIG. 5 is a view provided to explain a method for transmitting, by the multi display system 10, an image via the input connector 110 and the output connector 130 of display port format.

According to FIG. 5, the processor 140 may convert an input image into a DP format and transmit the converted image to an adjacent display apparatus. The DP format uses a main link, an auxiliary channel, and a hot plug detection line to transmit an image and a voice, and each display system of the multi display system corresponds to a sink device 100, 200, 300 of FIG. 5.

The main link is a main transmission channel of stream data, which is a unidirectional high speed channel for isochronous stream transmission. The main link may be used as one, two or four lanes, which is configured as a differential pair. The main link may have a bit rate of 2.7 Gbps and 1.6 Gbps per lane. In order to provide an isochronous transmission service, a source device 20 is configured to convert a signal of image and voice to be transmitted via the main link into a specific form and reconstruct the same, and transmit the reconstructed signal to each sink device 100, 200, 300.

The auxiliary channel provides a link service to configure and maintain the main link. Also, the auxiliary channel provides a service to identify whether data transmitted from the source device 20 may be indicated with no problem.

The hot plug detection (hereinafter, "HPD") line is a signal line to notify connection of the sink device 100, 200, 300 with the source device 20, which is used to check connection between each of the sink devices 100, 200, 300. The HPD signal notifies an event such as an interrupt request (IRQ), an unplug, a plug/re-plug, and the like.

The source device 20 becomes a master of an auxiliary channel, and the sink device 100, 200, 300 becomes a slave of the auxiliary channel. The source device as a master should initialize a request signal, and each sink device 100, 200, 300 may send a response signal according to the request signal. When the sink device 100, 200, 300 detects a HPD signal, the source device 20 should designate an auxiliary channel as an auxiliary standby state, and the sink device 100, 200, 300 should be placed in a standby state.

A type of link layer service of an auxiliary channel includes an auxiliary channel link service and an auxiliary channel apparatus service. A policy maker and the like may be used to manage links and apparatuses between the source device 20 and the sink devices 100, 200, 300.

An operation of an auxiliary channel is initiated by a HPD signal, and the source device 20 may receive input of the HPD signal and determine that the sink devices 100, 200, 300 are connected. When it is determined that the sink devices 100, 200, 300 are connected to each other, the source device 20 may, in order to initialize stream transmission, read extended display identification data (EDID) from each of the sink devices 100, 200, 300, and acquire information regarding link configuration, performance of each sink device 100, 200, 300, and link state.

When stream data is reproduced in each of the sink devices 100, 200, 300 based on information regarding EDID information and main stream attribute data, and the like, the source device 20 is configured to read display port configuration data (DPCD) and start link training. The link training refers to transmitting a training pattern via a physical layer of a main link to thereby configure the main link.

When the main link is configured without a problem through link training, the source device 20 is configured to transmit stream and attribute data to the sink devices 100, 200, 300 via the main link. When the link training fails, the source device 20 may perform a correct action.

A repeated operation of a main link configuration and the process of transmitting training pattern and checking link state, and the like, may end with pass or fail. A pass means that a bit rock occurs in a configured lane and a symbol lock occurs in every lane along with an inter-lane alignment, and a fail refers to the opposite.

After the main link is configured, the source device 20 performs a link state inspection every time a HPD toggle occurs after a positive edge of a HPD. The source device 20 inspects a DPCD link state area through an auxiliary channel reading operation within 100 ms after the positive edge of HPD, to thereby check a state change of the sink devices 100, 200, 300.

The auxiliary channel may be used for data transmission of an additional device, such as a USB device data transmission, a microphone, a camera, and the like, in a DP v1.2.

Figure 6A:
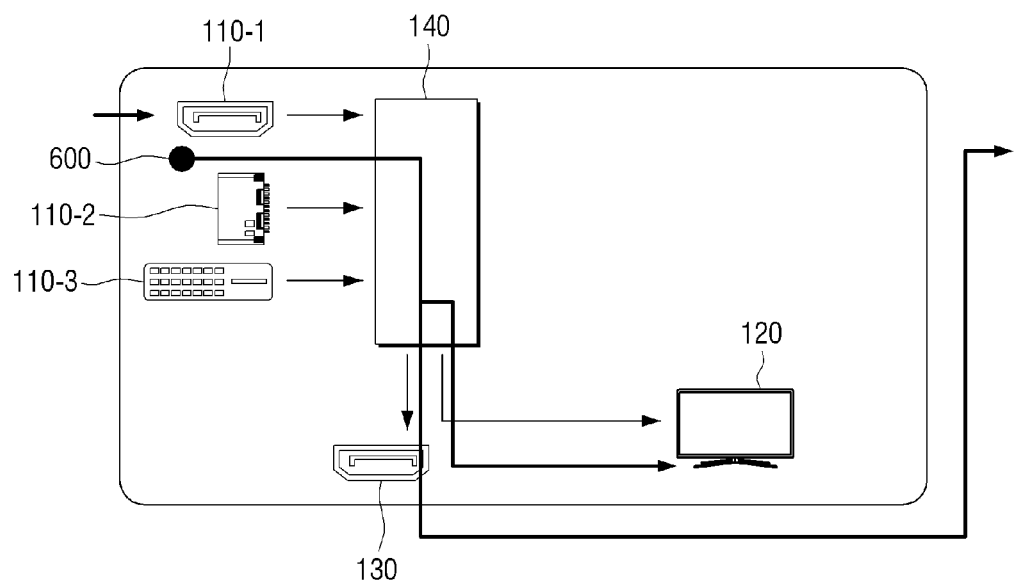
FIG. 6A is a view provided to explain a specific operation of a processor according to an exemplary embodiment.

FIG. 6A is a view provided to explain a specific operation of the processor 140 according to an exemplary embodiment. FIG. 6A illustrates formats of a DP 110-1, HDMI 110-2, and a DVI 110-3 for the input connector 110, but it is not limited thereto.

According to FIG. 6A, the processor 140 may extract information required for image processing by de-packaging and parsing an input image, and process an image corresponding to the display apparatus 100 from the parsed image. FIG. 6A illustrates an image is input through a DP 110-1, but this is only an example, and the image may as well be input through a different communication standard.

The processor 140 may process an image corresponding to the display apparatus 100, and then control the display 120 to display the processed image. In addition, the processor 140 may transmit an input image to an adjacent display apparatus 100 by using an output connector 130. When an image is input in a DP format, the processor 140 may immediately transmit the input image to the adjacent display apparatus, and when the image is input through a format other than DP format, the processor 140 may convert the input image to the DP format and transmit the converted image to the adjacent display apparatus.

Figure 6B:
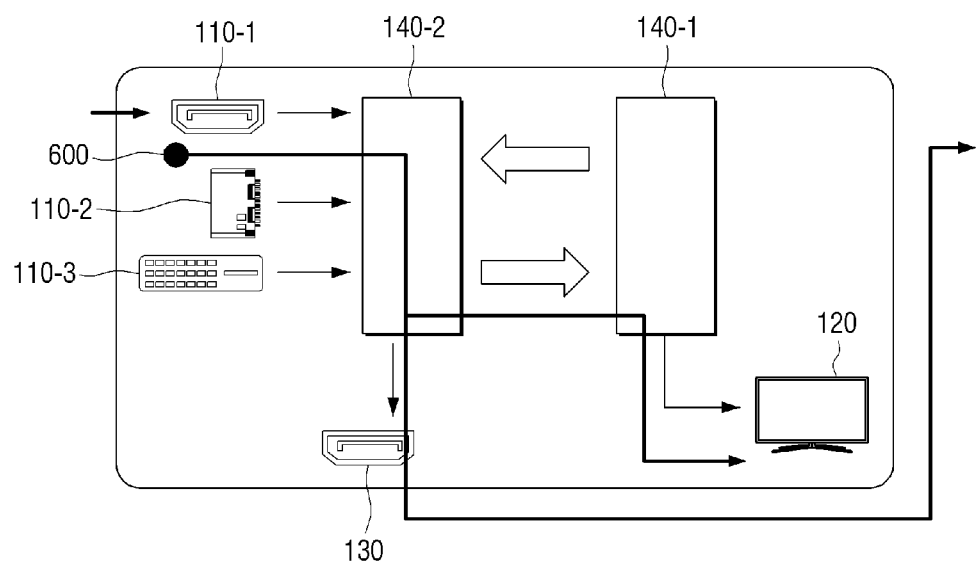
FIG. 6B is a view provided to explain a specific operation of the processor according to another exemplary embodiment.

According to FIG. 6B, the processor 140 may include a main processor 140-1 and a sub-processor 140-2. An image input by the input connector 110 may be transmitted to the sub-processor 140-2, and the sub-processor 140-2 may extract information required for image processing by de-packaging and parsing the input image, and when the parsing is complete, transmit the parsed image to the main processor 140-1.

The sub-processor 140-2 may re-package the parsed image, and transmit the re-packaged image to an adjacent display apparatus using the output connector 130. In this case, when an image is input in a DP format, the sub-processor 140-2 may immediately transmit the input image to the adjacent display apparatus, and when an image is input in a format different from the DP format, the sub-processor 140-2 may convert the image into the DP format and transmit the image to the adjacent display apparatus.

The main processor 140-1 may process an image corresponding to the display apparatus 100 from the parsed image, and then control the display 120 to display the processed image.

Like FIG. 6A, FIG. 6B also illustrates that an image is input through the DP 110-1, but this is only an example, and the image may as well be input through a different communication standard.

Figure 6C:
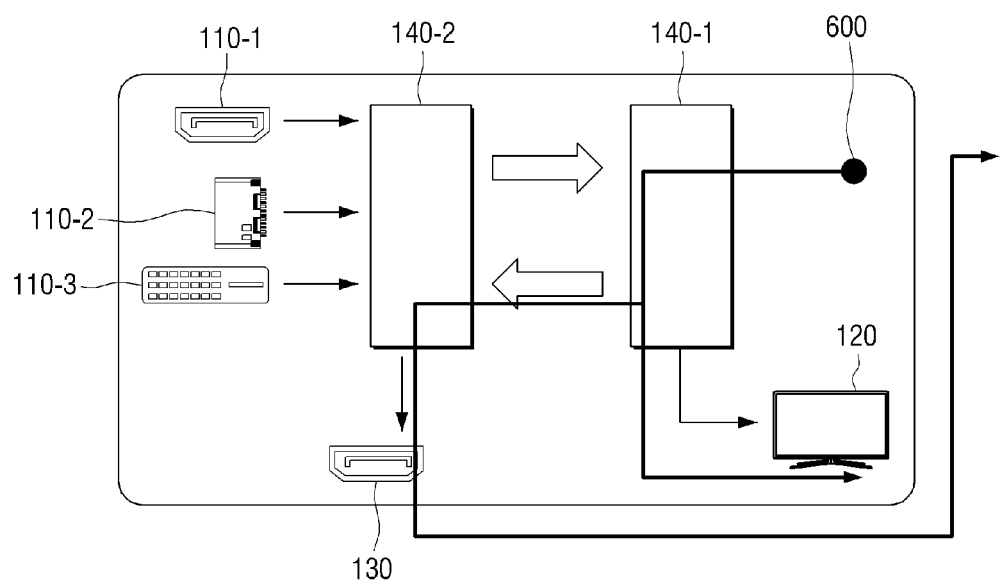
FIG. 6C is a view provided to explain a specific operation of the processor according to yet another exemplary embodiment.

According to FIG. 6C, the processor 140 may include the main processor 140-1 and the sub-processor 140-2. FIG. 6C illustrates that an image stored within the display apparatus 100 is processed by the main processor 140-1. However, this is only an example, and the image may be as well be input to the main processor 140-1 using the input connector 110 as in FIGS. 6A and 6B.

The main processor 140-1 may extract information required for image processing by de-packaging and parsing an input image, process an image corresponding to the display apparatus 100 from the parsed image, and control the display 120 to display the processed image. Also, the main processor 140-1 may transmit the input to the sub-processor 140-2.

The sub-processor 140-2 may transmit an image input to an adjacent display apparatus. In this case, the sub-processor 140-2 may convert the input image into a DP format and transmit the converted image to the adjacent display apparatus.

FIGS. 6A to 6C illustrate exemplary embodiments that distinguish a configuration and operation of the processor according to a distribution of resources and power efficiency. In FIGS. 6A to 6C, a flow 600 of the respective operation is indicated by a solid line.

Figure 7:
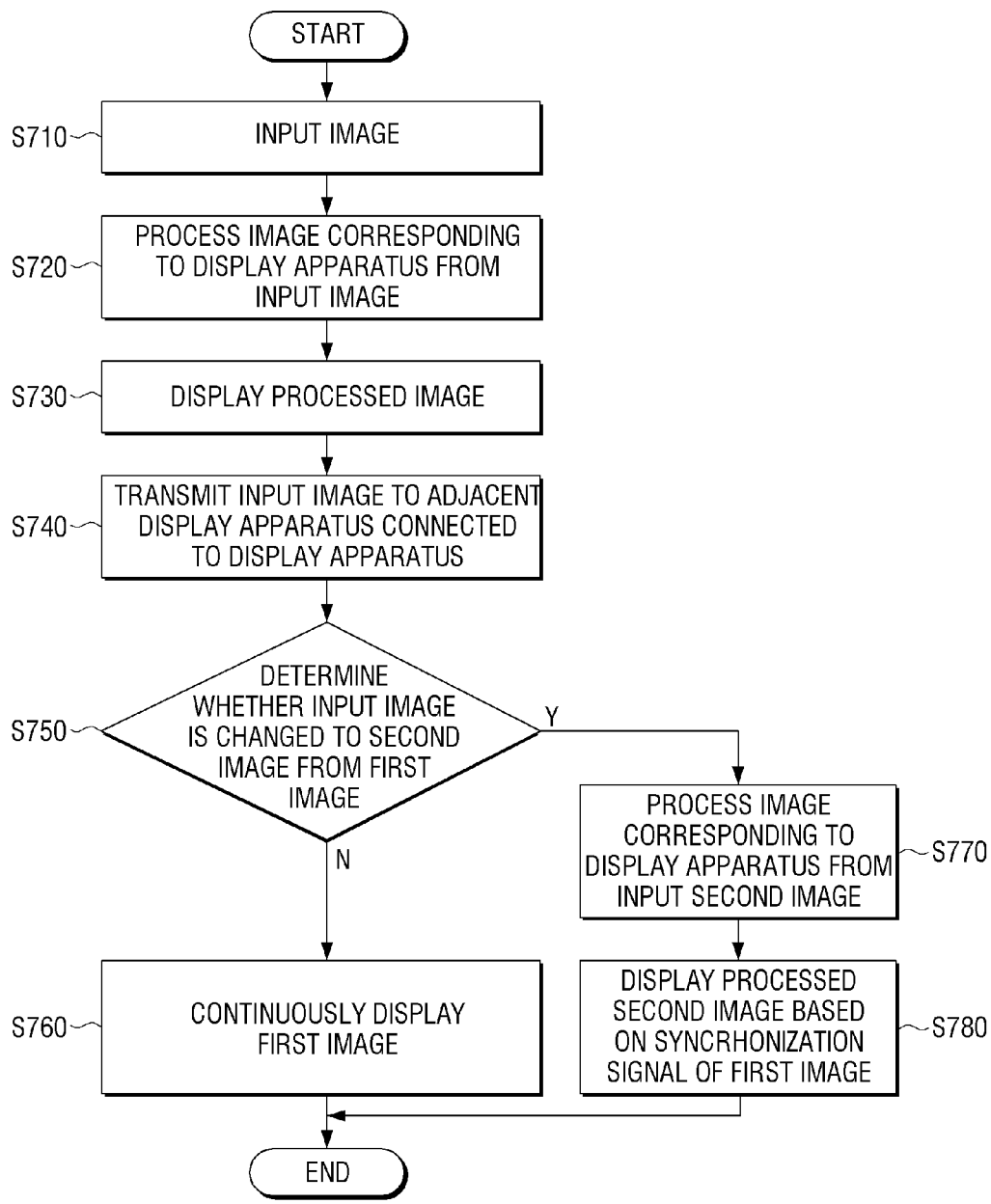
FIG. 7 is a flowchart provided to explain a method for controlling a display apparatus according to an exemplary embodiment.

FIG. 7 is a flowchart provided to explain a method of controlling the display apparatus 100 according to an exemplary embodiment.

According to FIG. 7, the display apparatus 100 constituting the multi display system 10 receives input of an image S710. The display apparatus 100 may receive input of an image from the input connector 110 of various formats. The input connector 110 may include an input connector of at least one of DP, DVI and HDMI formats.

Then, the display apparatus 100 processes an image corresponding to the display apparatus 100 from the input image S720. Then, the display apparatus 100 displays the processed image S730. Then, the display apparatus 100 transmits the input image to an adjacent display apparatus connected to the display apparatus 100 S740. However, this is only an example, and the transmitting of the input image may be carried out simultaneously with the processing the image S720 or the displaying the processed image S730.

The display apparatus 100 determines whether the input image is changed to a second image from a first image S750. Upon determining that the input image is not changed, the display apparatus 100 continuously displays the first image S760.

When the input image is changed to the second image from the first image, the display apparatus 100 processes an image corresponding to the display apparatus 100 from the input second image S770. Then, the display apparatus 100 displays the processed second image based on a synchronization signal of the first image S780.

The determining S750 may include, when at least one of a resolution and a frame rate of the input image is changed, determining that the input image is changed to the second image from the first image.

The processing S770 may include displaying the processed second image based on the synchronization signal of the first image when a phase difference between a synchronization signal of the first image and a synchronization signal of the second image is greater than or equal to a predetermined value.

The displaying S780 may include continuously displaying a last image of the first image until the second image is processed and displayed.

The processing S770 may include extracting information required for image processing by de-packaging and parsing the input image, and processing an image corresponding to the display apparatus 100 from the parsed image.

The processing S770 may include extracting, by the sub-processor, information required for image processing by de-packaging and parsing the input image, when the parsing is complete, transmitting, by the sub-processor, the parsed image to the main processor, and processing, by the main processor, an image corresponding to the display apparatus 100 from the parsed image, and herein the transmitting may include re-packaging, by the sub-processor, the parsed image and transmitting the re-packaged image to the adjacent display apparatus.

The processing S770 may include generating an image corresponding to the display apparatus by cropping the input image into a plurality of images according to the number of display apparatuses 100 constituting the multi display system, and scaling the image to correspond to resolution of the display apparatus 100.

The transmitting S740 may include converting the input image into a DP format and transmitting the converted image to an adjacent display apparatus.

In addition, an image may be input via an input connector of at least one of DP, DVI and HDMI formats.

According to the aforementioned various exemplary embodiments, even if an image to be input is changed, the display apparatus 100 may display the changed image based on a synchronization signal before the image is changed, to thereby maintaining a frame lock and providing a seamless image to a user.

The methods according to the aforementioned various exemplary embodiments may be programmed and stored in various storage media. Accordingly, the methods according to the aforementioned various exemplary embodiments may be embodied in an electronic device of various types to execute a storage medium.

Specifically, according to an exemplary embodiment, a non-transitory computer readable medium of stored program is provided, wherein the program is to sequentially perform receiving input of an image, processing an image corresponding to a display apparatus from the input image, displaying the processed image, and transmitting the input image to an adjacent display apparatus connected to the display apparatus, wherein the processing includes, in response to the input image being changed to a second image from a first image, processing an image corresponding to the display apparatus from the input second image, and wherein the displaying includes displaying the processed second image based on a synchronization signal of the first image.

A non-transitory computer readable medium refers to a computer readable medium that stores data semi-permanently and not for a short period of time such as a register, cache, memory, and the like. The aforementioned various applications or programs may be stored in a non-transitory computer readable medium such as a CD, a DVD, a hard disk, a Blu-ray disk, a USB stick, a memory card, and a ROM.

Further, the above one or more exemplary embodiments describe non-limiting exemplary embodiments, which may be modified and embodied by one of ordinary skill without going beyond the concept of the present disclosure recited in the claims as well, and these modified embodiments should not be understood individually from the technical idea or prospect of the present disclosure.

What is claimed is:

1. A display apparatus of a multi display system, the apparatus comprising:
   a display;
   a first input connector;
   a second input connector;
   an output connector; and
   a processor configured to receive a first image through the first input connector, process the first image, control the display to display the processed first image on the display and transmit the received first image to another display apparatus of the multi display system connected to the display apparatus through the output connector,
   wherein the processor, in response to a user command for changing an input connector from the first input connector to the second input connector being inputted, receives a second image through the second input connector, processes the second image and controls the display to display the processed second image based on a synchronization signal of the first image, and
   wherein a type of the first input connector is different from a type of the second input connector.

2. The apparatus as claimed in claim 1, wherein the processor, in response to at least one of resolution and a frame rate of an image displayed on the display being changed, determines that an input connector is changed from the first input connector to the second input connector.

3. The apparatus as claimed in claim 1, wherein the processor, in response to a phase difference between a synchronization signal of the first image and a synchronization signal of the second image being greater than or equal to a predetermined value, displays the processed second image based on the synchronization signal of the first image.

4. The apparatus as claimed in claim 1, wherein the processor continuously displays a last image of the first image until the second image is processed and displayed.

5. The apparatus as claimed in claim 1, wherein the processor extracts information required for the processing of the first and second images by de-packaging and parsing the received first and second images, and processes the first and second images corresponding to the display apparatus based on the parsed images.

6. The apparatus as claimed in claim 1, wherein the processor comprises:
    a main processor; and
    a sub-processor configured to extract information required for the processing of the first and second images by de-packaging and parsing the received first and second images, and, in response to the parsing being complete, transmit the parsed first and second images to the main processor,
    wherein the main processor is configured to process the first and second images corresponding to the display apparatus from the parsed images, and
    wherein the sub processor re-packages the parsed first and second images and transmits the repackaged first and second images to the another display apparatus.

7. The apparatus as claimed in claim 1, wherein the processor comprises:
    a main processor; and
    a sub-processor,
    wherein the main processor is configured to extract information required for the processing of the first and second images by de-packaging and parsing the received first and second images, process the first and second images corresponding to the display apparatus from the parsed first and second images, and transmit the received first and second images to the sub-processor, and the sub-processor is configured to transmit the received first and second images to the another display apparatus.

8. The apparatus as claimed in claim 1, wherein the processor crops the received first and second images into a plurality of images according to a number of display apparatuses constituting the multi display system, and generates the processed first and second images by scaling the first and second images to correspond to resolution of the display apparatus.

9. The apparatus as claimed in claim 1, wherein the processor converts the received first and second images into a display port format and transmits the converted first and second images to the another display apparatus.

10. The apparatus as claimed in claim 1, wherein the first and second input connectors are one of a Display Port (DP), a Digital Visual Interface (DVI), and a High Definition Multimedia Interface (HDMI).

11. A method of controlling a display apparatus of a multi display system, the method comprising:
    receiving a first image through a first input connector of the display apparatus;
    processing the first image;
    displaying the processed first image;
    transmitting the received first image to another display apparatus of the multi display system connected to the display apparatus,
    wherein the processing includes, in response to a user command for changing an input connector from the first input connector to a second input connector being inputted, receiving a second image through the second input connector, processing the second image and displaying the processed second image based on a synchronization signal of the first image,
    wherein a type of the first input connector is different from a type of the second input connector.

12. The method as claimed in claim 11, wherein the processing comprises, in response to at least one of a resolution and a frame rate of an image displayed on the display being changed, determining that an input connector is changed from the first input connector to the second input connector.

13. The method as claimed in claim 11, wherein the processing comprises, in response to a phase difference between a synchronization signal of the first image and a synchronization signal of the second image being greater than or equal to a predetermined value, displaying the processed second image based on the synchronization signal of the first image.

14. The method as claimed in claim 11, wherein the displaying comprises continuously displaying a last image of the first image until the second image is processed and displayed.

15. The method as claimed in claim 11, wherein the processing comprises extracting information required for the processing of the first and second images by de-packaging and parsing the received first and second images, and processing the first and second images corresponding to the display apparatus based on the parsed images.

16. The method as claimed in claim 11, wherein the processing comprises:
    extracting, by a sub-processor, information required for the processing of the first and second images by de-packaging and parsing the received first and second images, and in response to the parsing being complete, transmitting, by the sub-processor, the parsed first and second images to a main processor; and
    processing, by the main processor, the first and second images corresponding to the display apparatus from the parsed first and second images,
    wherein the transmitting includes re-packaging, by the sub-processor, the parsed first and second images and transmitting, by the sub-processor, the re-packaged first and second images to the another display apparatus.

17. The method as claimed in claim 11, wherein the processing comprises extracting, by a main processor, information required for the processing of the first and second images by de-packaging and parsing the received first and second images, processing, by the main processor, images corresponding to the display apparatus from the parsed first and second images, and transmitting, by the main processor, the received first and second images to a sub-processor, and
    wherein the transmitting the received first and second images to the adjacent display apparatus comprises transmitting, by the sub-processor, the received first and second images to the another display apparatus.

18. The method as claimed in claim 11, wherein the processing comprises cropping the received first and second images into a plurality of images according to a number of display apparatuses constituting the multi display system, and generating the processed first and second images by scaling the first and second images to correspond to resolution of the display apparatus.

19. The method as claimed in claim 11, wherein the transmitting comprises converting the received first and second images into a display port format and transmitting the converted first and second images to the another display apparatus.

20. The method as claimed in claim 11, wherein the first and second input connectors are one of a Display Port (DP), a Digital Visual Interface (DVI), and a High Definition Multimedia Interface (HDMI).

* * * * *